United States Patent
Aizawa

(10) Patent No.: US 11,418,666 B2
(45) Date of Patent: Aug. 16, 2022

(54) IMAGE FORMING SYSTEM INCLUDING FIRST STORAGE THAT STORES PAPER EJECTED AFTER IMAGE FORMATION PROCESSING AND SECOND STORAGE THAT STORES PAPER TRANSFERRED FROM FIRST STORAGE, CONTROL METHOD OF IMAGE FORMING SYSTEM, AND PROGRAM FOR ALLOWING COMPUTER TO EXECUTE CONTROL METHOD

(71) Applicant: KONICA MINOLTA, INC., Tokyo (JP)

(72) Inventor: Hiroaki Aizawa, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/225,328

(22) Filed: Apr. 8, 2021

(65) Prior Publication Data
US 2021/0360117 A1   Nov. 18, 2021

(30) Foreign Application Priority Data
May 13, 2020 (JP) .............................. JP2020-084345

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ..... *H04N 1/00663* (2013.01); *H04N 1/00641* (2013.01); *H04N 2201/0094* (2013.01)

(58) Field of Classification Search
CPC ........... H04N 1/00663; H04N 1/00641; H04N 2201/0094
USPC ................................ 358/1.15, 1.14, 1.13, 11
See application file for complete search history.

(56) References Cited

U.S. PATENT DOCUMENTS

| | | | |
|---|---|---|---|
| 5,957,450 A * | 9/1999 | Kida .................. | G03G 15/6552 271/291 |
| 6,246,491 B1 * | 6/2001 | Matsumoto ........ | H04N 1/00567 358/401 |
| 10,646,878 B1 * | 5/2020 | Chang ................. | B02C 18/0007 |
| 2008/0291491 A1 * | 11/2008 | Chabrol ............... | G06F 3/1222 358/1.15 |
| 2015/0000488 A1 | 1/2015 | Yanagawa et al. | |
| 2018/0329334 A1 * | 11/2018 | Tanaka ............... | G03G 21/0064 |
| 2019/0041776 A1 * | 2/2019 | Oshima .............. | G03G 15/2025 |
| 2020/0404115 A1 * | 12/2020 | Asaka ................ | H04N 1/00639 |

FOREIGN PATENT DOCUMENTS

JP    2015009341 A    1/2015

* cited by examiner

*Primary Examiner* — Douglas Q Tran
(74) *Attorney, Agent, or Firm* — Holtz, Holtz & Volek PC

(57) ABSTRACT

An image forming system includes: a first storage that stores paper ejected after image formation processing; a second storage that stores the paper transferred from the first storage; a hardware processor that controls an operation of the image forming system; and a notifier that notifies of a state of the image forming system, wherein the hardware processor determines whether the paper remains in the first storage, and allows the notifier to notify that the paper is left untaken based on determination that the paper remains in the first storage.

17 Claims, 9 Drawing Sheets

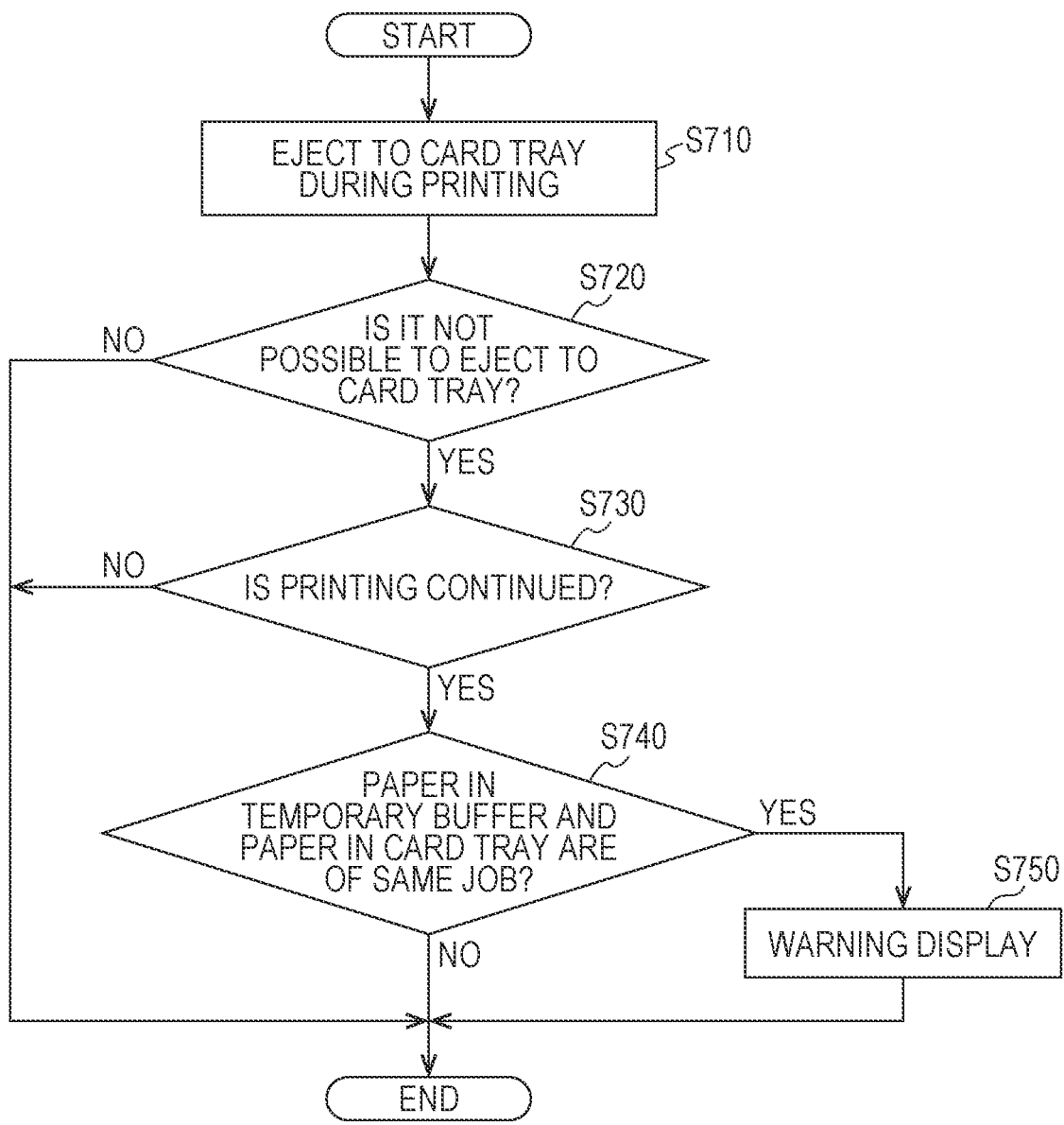

IMAGE FORMING SYSTEM INCLUDING FIRST STORAGE THAT STORES PAPER EJECTED AFTER IMAGE FORMATION PROCESSING AND SECOND STORAGE THAT STORES PAPER TRANSFERRED FROM FIRST STORAGE, CONTROL METHOD OF IMAGE FORMING SYSTEM, AND PROGRAM FOR ALLOWING COMPUTER TO EXECUTE CONTROL METHOD

The entire disclosure of Japanese patent Application No. 2020-084345, filed on May 13, 2020, is incorporated herein by reference in its entirety.

BACKGROUND

Technological Field

The present disclosure relates generally to control of an image forming device, and more specifically to control of paper ejection of the image forming device.

Description of the Related Art

After printing or other image forming processing by an image forming device (hereinafter, also referred to as multi-functional peripheral (MFP)) is performed, an optional step of processing a printed matter might be performed. One of the optional steps is cutting with a cutting device. When the optional step is added, it might take a long time to complete the processing because some steps do not operate. Therefore, it is necessary to reduce time referred to as downtime in which a device does not operate. For example, JP 2015-9341 A discloses "a cutting device capable of reducing time in which a device does not operate" (refer to "summary").

When a printed matter or other recording medium ejected after image formation is processed in an optional step, a plurality of storages might be used for storing the processed recording medium. In this case, after the optional step is completed, the recording medium ejected to any one of the storages might be left untaken. Therefore, there is a need for a technology of preventing the recording medium from being left untaken.

SUMMARY

The present disclosure is achieved in view of the above-described background, and according to a certain embodiment, a technology of preventing the recording medium from being left untaken from an image forming system is provided.

To achieve the abovementioned object, according to an aspect of the present invention, an image forming system reflecting one aspect of the present invention comprises: a first storage that stores paper ejected after image formation processing; a second storage that stores the paper transferred from the first storage; a hardware processor that controls an operation of the image forming system; and a notifier that notifies of a state of the image forming system, wherein the hardware processor determines whether the paper remains in the first storage, and allows the notifier to notify that the paper is left untaken based on determination that the paper remains in the first storage.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 7 is a flowchart illustrating a part of processing executed by the CPU of the image forming device;

DETAILED DESCRIPTION OF EMBODIMENTS

Hereinafter, one or more embodiments of the present invention will be described with reference to the drawings. However, the scope of the invention is not limited to the disclosed embodiments. In the following description, the same parts are assigned with the same reference signs. Their names and functions are also the same. Therefore, detailed description thereof is not repeated.

In an image forming system according to a certain aspect, when a job is finished in a state in which a card tray is filled with ejected paper and partially cut cards or other printed matters remain in a temporary buffer, a user sometimes does not notice that the printed matters remain in the temporary buffer.

For example, if the cards cut into a card size are directly ejected to the card tray, a distance to the card tray is long and ejection accuracy is deteriorated, so that the cut cards might be ejected separately. Therefore, a mechanism is conceivable in which the cut cards are temporarily ejected to the temporary buffer, and when a certain number of cards are accumulated, they are ejected at once into the card tray, so that the ejection accuracy is improved.

In a case where a job is executed in which it is ejected more than capacity of the card tray, the user pulls out the filled card tray, takes out the cards as the printed matters, and empty the card tray in order to obtain all the printed matters.

The user then needs to insert the card tray and eject the cards remaining in the temporary buffer again.

However, if the user inserts the card tray without noticing that the cards remain in the temporary buffer, the printed matter based on the same job stored in the temporary buffer is ejected to the card tray. If a job based on another user's instruction is executed in this state, the printed matter as a result of the execution is ejected from the temporary buffer to the card tray. As a result, the printed matters of the respective jobs are mixed and the printed matters of the respective jobs are carried out by the same user, which might lead to a printing accident.

Therefore, as described below, an image forming system 100 according to a certain embodiment is provided with a plurality of storages (internal trays (also referred to as a temporary buffer, a buffer tray and the like)) and may notify that a recording medium being a product of image formation remains in the storages, so that occurrence of the printing accident may be suppressed.

<Configuration of Image Forming System>

Figure 1:
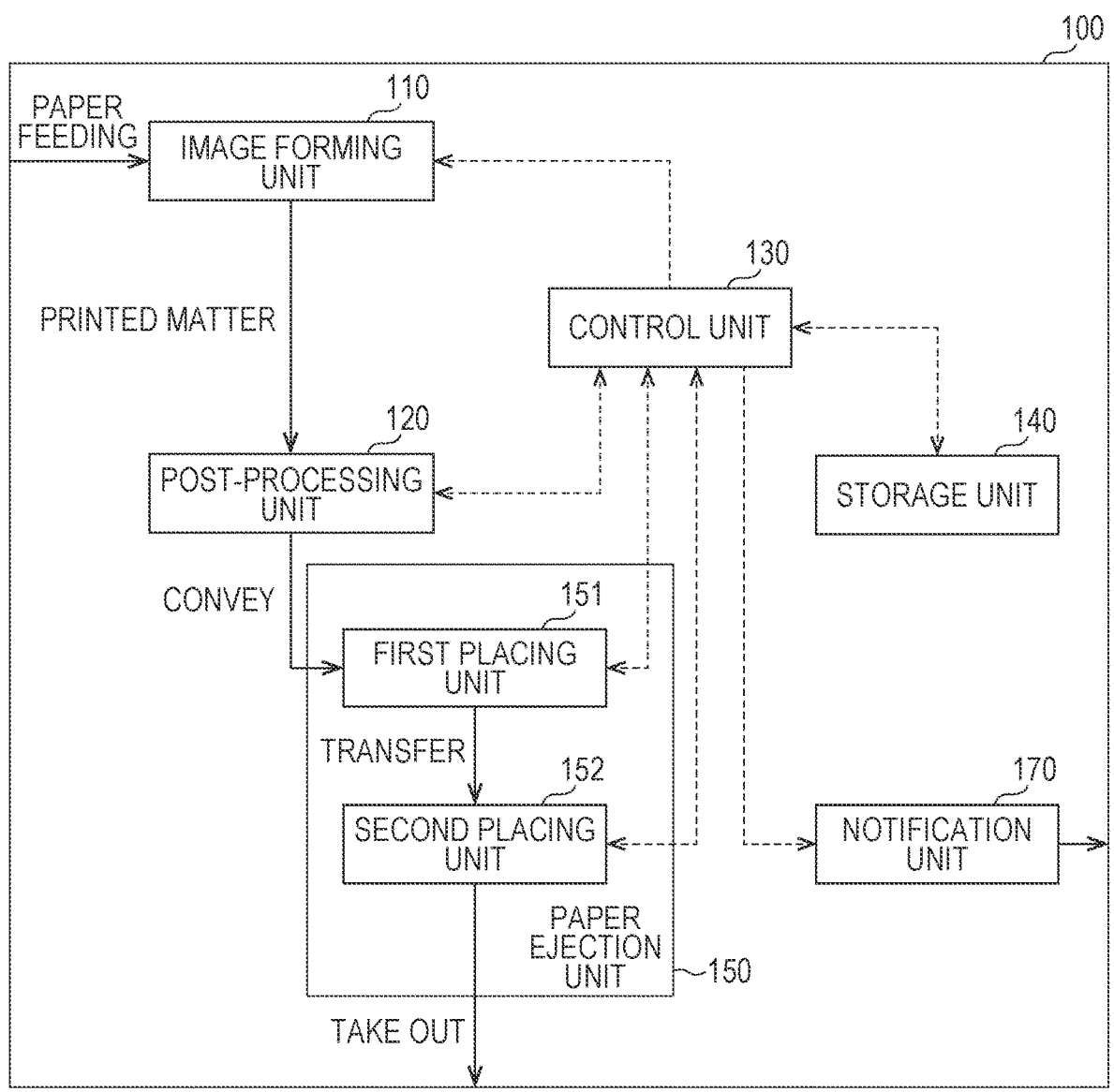
FIG. 1 is a block diagram illustrating an outline of functions realized by an image forming system.

First, a configuration of the image forming system 100 is described with reference to FIG. 1. FIG. 1 is a block diagram illustrating an outline of functions realized by the image forming system 100. The image forming system 100 is provided with an image forming unit 110, a post-processing unit 120, a control unit 130, a storage unit 140, a paper ejection unit 150, and a notification unit 170. The paper ejection unit 150 includes a first placing unit 151 and a second placing unit 152. Meanwhile, as a configuration of another aspect, the paper ejection unit 150 may also be included in the post-processing unit 120.

The image forming unit 110 forms an image on paper or other recording medium using data provided to the image forming system 100 or data obtained by the image forming system 100. The recording medium on which the image is formed (for example, a printed matter) is conveyed to the post-processing unit 120.

The post-processing unit 120 executes one or a plurality of pieces of post-processing on the paper ejected from the image forming unit 110. The post-processing includes, for example, paper cutting, punch hole formation, paper folding and the like. The post-processing unit 120 is realized by a device according to contents of the post-processing. For example, in a case where the post-processing is paper cutting, the post-processing unit 120 is realized as a cutting device. As the post-processing unit 120, a mechanism that realizes each of one or a plurality of pieces of post-processing may be attached to the image forming system 100. When completing predetermined post-processing, the post-processing unit 120 conveys the paper to the paper ejection unit 150.

The control unit 130 controls an operation of the image forming system 100. In a certain aspect, the control unit 130 allows the image forming unit 110 to execute processing according to a command based on the command input to the image forming system 100.

The storage unit 140 holds data and a program prepared in advance by a manufacturer of the image forming system 100. In a certain aspect, the storage unit 140 may further hold data input by a user of the image forming system 100 and data generated by the image forming system 100. The storage unit 140 is realized by a hard disk device, a flash memory, a random access memory (RAM), a detachable storage device, and other storage devices.

In the paper ejection unit 150, the first placing unit 151 receives the paper ejected from the post-processing unit 120. The second placing unit 152 receives the paper ejected from the first placing unit 151. In a certain aspect, the first placing unit 151 temporarily holds the paper as a buffer until the paper is transferred to the second placing unit 152. The second placing unit 152 holds the paper until this is taken out by the user. The first placing unit 151 is provided inside the image forming system 100 to store the recording medium. For example, the first placing unit 151 is realized as a built-in tray. The second placing unit 152 is configured so that the recording medium may be taken out of the image forming system 100. For example, the second placing unit 152 is realized as a drawable tray.

In a certain aspect, the first placing unit 151 includes a tray (not illustrated) that receives the paper ejected from the post-processing unit 120, and an actuator (not illustrated) that lifts the tray up and down. When the tray is lifted down, the paper is conveyed to the second placing unit 152. The second placing unit 152 includes a tray (not illustrated) that receives the paper ejected from the first placing unit 151, an actuator (not illustrated) that drives the tray back and forth, and an actuator (not illustrated) that lifts the tray up and down.

The notification unit 170 notifies of a state of the image forming system 100 based on a signal output from the control unit 130. The notification unit 170 is realized by a monitor, a light emitting diode (LED) or a light, a rotating light or other light emitting devices, a speaker, a communication interface that communicates with the outside and the like. In a certain aspect, the notification unit 170 notifies that the paper remains in the first placing unit 151 or the second placing unit 152.

Figure 2:
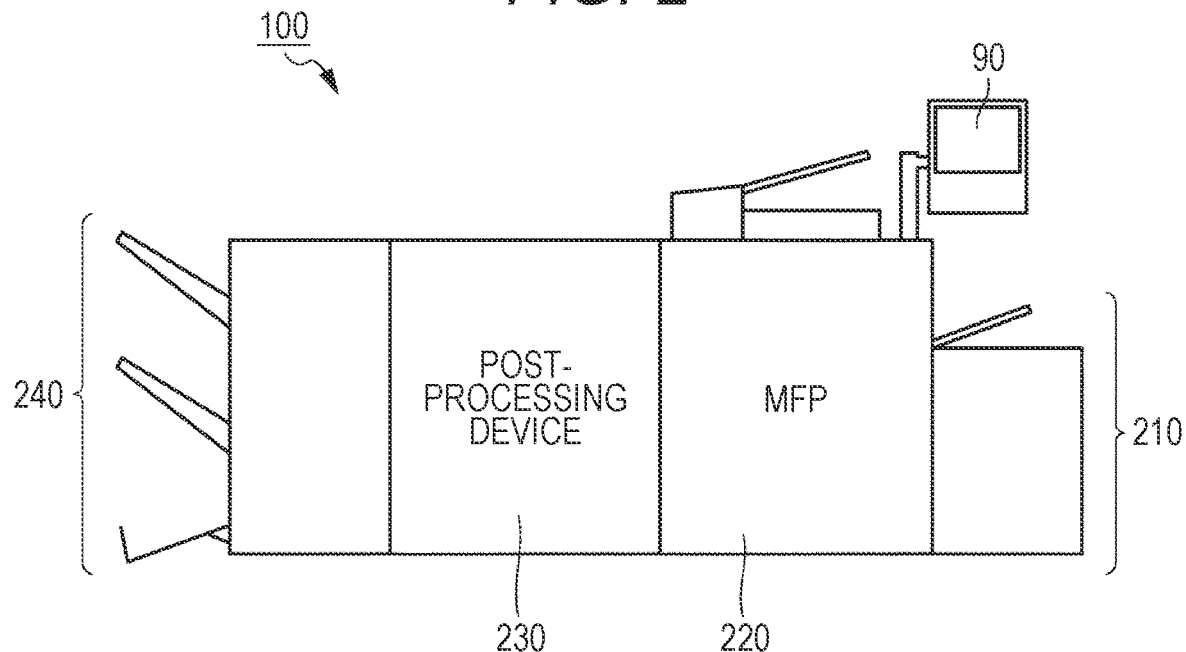
FIG. 2 is a view illustrating an appearance of a hardware configuration of the image forming system.

The configuration of the image forming system 100 is further described with reference to FIG. 2. FIG. 2 is a view illustrating an appearance of a hardware configuration of the image forming system 100. The image forming system 100 is provided with a paper feeding device 210, an image forming device 220, a post-processing device 230, and a paper ejection device 240.

The paper feeding device 210 feeds paper to the image forming device 220. The image forming device 220 forms an image on the paper conveyed from the paper feeding device 210 or an auto feeder. The image forming device 220 conveys the paper on which the image is formed to the post-processing device 230. The post-processing device 230 is, for example, a cutting device. In this case, the cutting device cuts the paper into a predetermined size using an attached cutter (not illustrated).

The paper ejection device 240 includes a buffer tray that temporarily holds the paper ejected from the post-processing device 230, and one or a plurality of paper ejection trays. The buffer tray corresponds to the first placing unit 151. The paper ejection tray corresponds to the second placing unit 152. When the buffer tray is filled with paper, the paper is conveyed to any one of the paper ejection trays. In a certain aspect, the buffer tray does not convey the paper to the paper ejection tray until the buffer tray is filled with paper. In another aspect, the buffer tray may convey the paper to the paper ejection tray in a case where the image forming system 100 receives an instruction to convey the paper.

<Configuration of Post-Processing Device>

Figure 3:
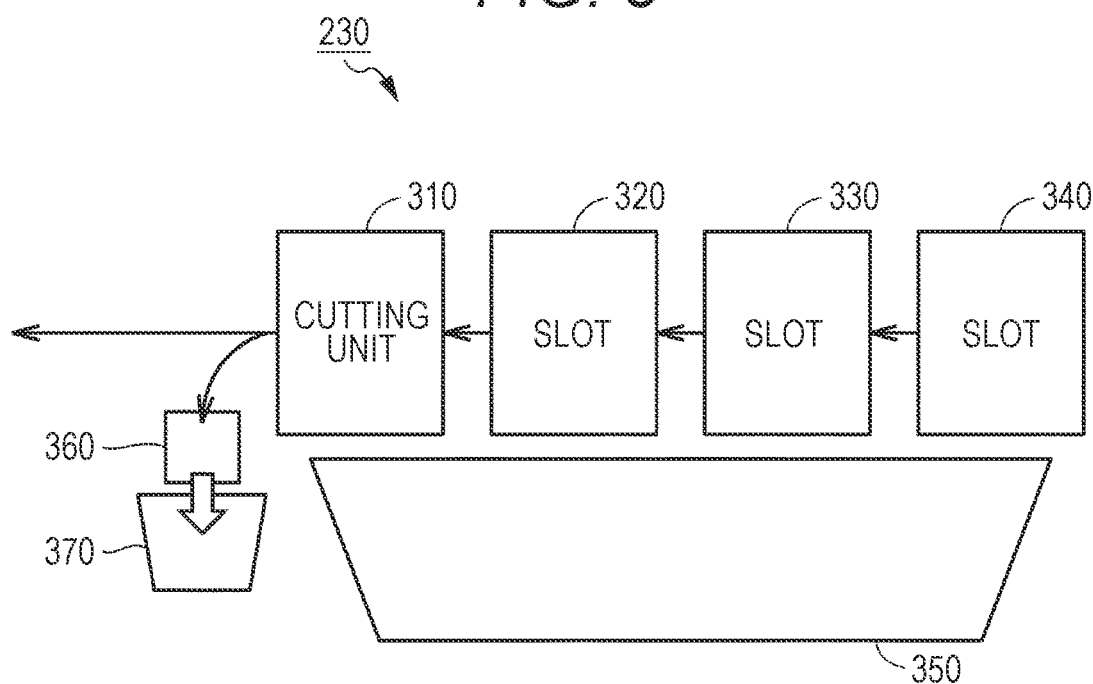
FIG. 3 is a block diagram illustrating an outline of a configuration of a post-processing device according to a certain embodiment.

A configuration of the post-processing device 230 is described with reference to FIG. 3. FIG. 3 is a block diagram illustrating an outline of the configuration of the post-processing device 230 according to a certain embodiment. As an example, the post-processing device 230 cuts a business card document formed on A3 paper into a business card size. The post-processing device 230 is provided with a cutting unit 310, slots 320, 330, and 340, a cut waste box 350, a temporary buffer 360, and a card tray 370.

The cutting unit 310 is provided with a line sensor and a cutter unit in a certain aspect. The line sensor detects a position of the paper, and the cutter unit moves to the detected position. The cutter unit cuts the paper at that position. For example, the cutter unit cuts the business card document printed on A3 paper into paper of a size set as a business card size.

The slots 320, 330, and 340 accept attachment of units for realizing other processing designated as post-processing steps. Other processing may include, for example, line-folding, saddle stitching, side stitching, punched hole formation and the like.

The cut waste box 350 stores a cut waste ejected from the cutting unit 310.

The temporary buffer 360 temporarily stores the paper conveyed from the cutting unit 310. When the temporary buffer 360 is filled with paper, the paper is conveyed from the temporary buffer 360 to the card tray 370. The user may take out the printed matter (for example, business card, invitation card, New Year's card and the like) by drawing the card tray 370.

<Configuration of Image Forming Device>

Figure 4:
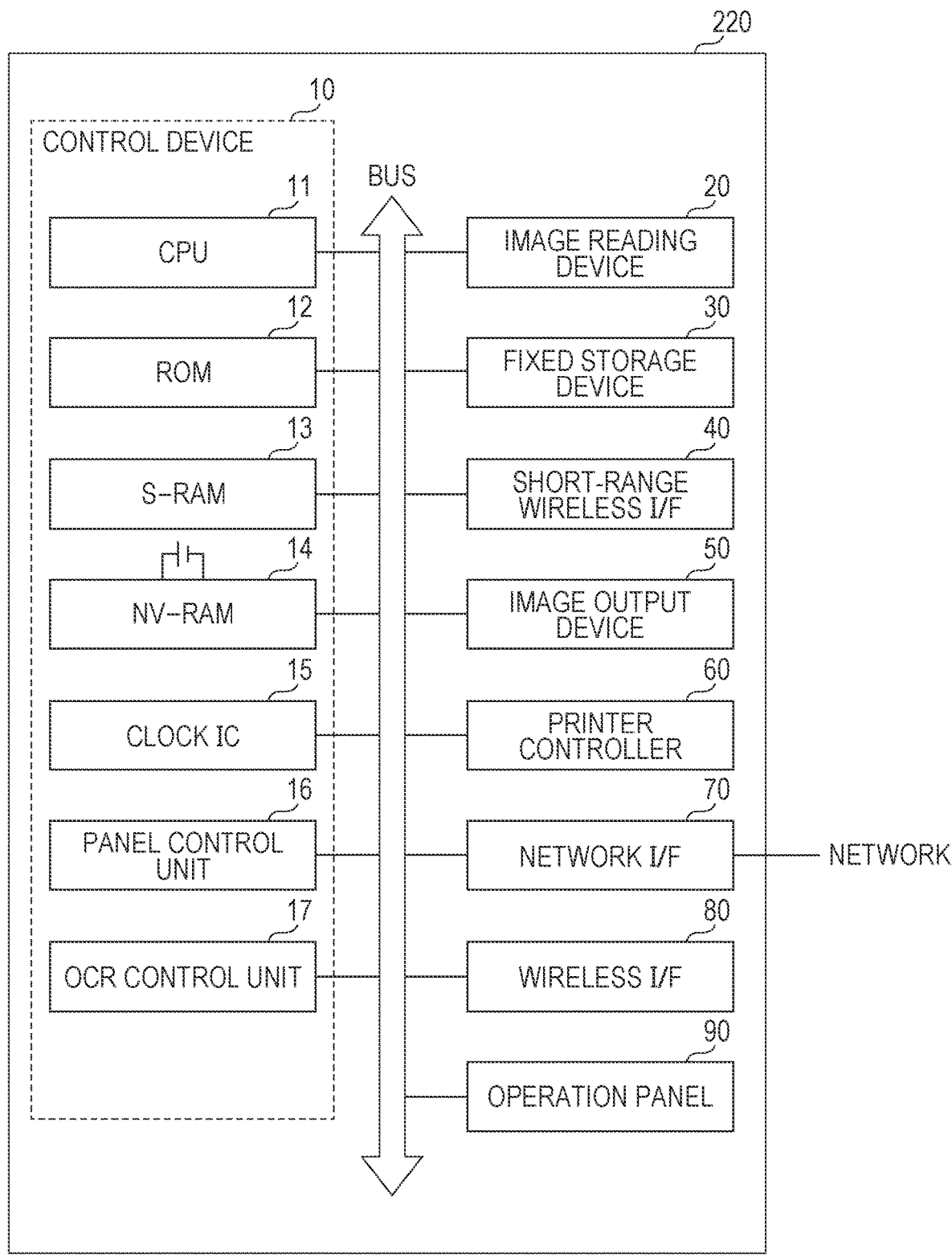
FIG. 4 is a block diagram illustrating a hardware configuration of an image forming device according to a certain embodiment.

A configuration of the image forming device 220 is described with reference to FIG. 4. FIG. 4 is a block diagram illustrating a hardware configuration of the image forming device 220 according to a certain embodiment. The image forming device 220 is provided with a control device 10, an image reading device 20, a fixed storage device 30, a short-range wireless interface (I/F) 40, an image output device 50, a printer controller 60, a network I/F 70, a wireless I/F 80, and an operation panel 90 as main components. Each component is connected to a bus.

The control device 10 includes a central processing unit (CPU) 11, a read only memory (ROM) 12, a static random access memory (SRAM) 13, a non-volatile random access memory (NVRAM) 14, a clock integrated circuit (IC) 15, a panel control unit 16, and an optical code reader (OCR) control unit 17.

The control device 10 controls the image forming device 220. More specifically, the CPU 11 executes commands stored in the ROM 12, the SRAM 13, the NVRAM 14 and the like, and allows the image forming device 220 to realize a predetermined operation. The ROM 12 holds data and the command prepared in advance for controlling the image forming device 220.

The SRAM 13 holds data frequently accessed by the CPU 11 as a cache memory. The NVRAM 14 includes a flash memory and holds data even in a case where the image forming device 220 is not supplied with power.

The clock IC 15 measures time in the image forming device 220. The panel control unit 16 detects a touch operation on the operation panel 90 and outputs a signal corresponding to the touch operation to the CPU 11. The OCR control unit 17 recognizes a text portion from image data of a document read by the image reading device 20, and converts the text portion into a character string.

The image reading device 20 includes a scanner. The image reading device 20 scans a document placed on a document tray to obtain image data of the document.

The fixed storage device 30 is realized by a non-volatile storage device such as a hard disk or a flash memory, for example, and holds the data generated by the image forming device 220 or the data received by the image forming device 220 in a non-volatile manner.

The image output device 50 realizes a copy function or a print function. In a case where an operation mode of the image forming device 220 is a copy mode, the image output device 50 forms the image read by the image reading device 20 on paper or other printing medium. In another aspect, in a case where the operation mode of the image forming device 220 is a print mode, the image output device 50 forms an image on a recording medium based on the data input from another information processing device connected via a network to the image forming device 220 or the data stored in the image forming device 220.

The printer controller 60 controls an operation of the image output device 50 as a printer based on the command output from the control device 10.

The network I/F 70 controls communication with other information communication devices (for example, a computer device that uses the image forming device 220 as a printer) via a local area network (LAN) or other networks to which the image forming device 220 is connected.

The wireless I/F 80 realizes communication with other devices by wireless communication standard such as WiFi (registered trademark), Bluetooth (registered trademark), and near field communication (NFC). Meanwhile, the wireless communication standard is not limited to the above-described standard.

The operation panel 90 is realized by a physical key, a touch panel and the like. The operation panel 90 receives an input of a command to the image forming device 220, and transmits a signal corresponding to the command to the control device 10. In another aspect, the operation panel 90 displays a state of the image forming system 100 as a monitor. The operation panel 90 includes a display panel such as an organic electro luminescence (EL) monitor and a liquid crystal monitor.

<Configuration of Paper Ejection Unit>

Figure 5:
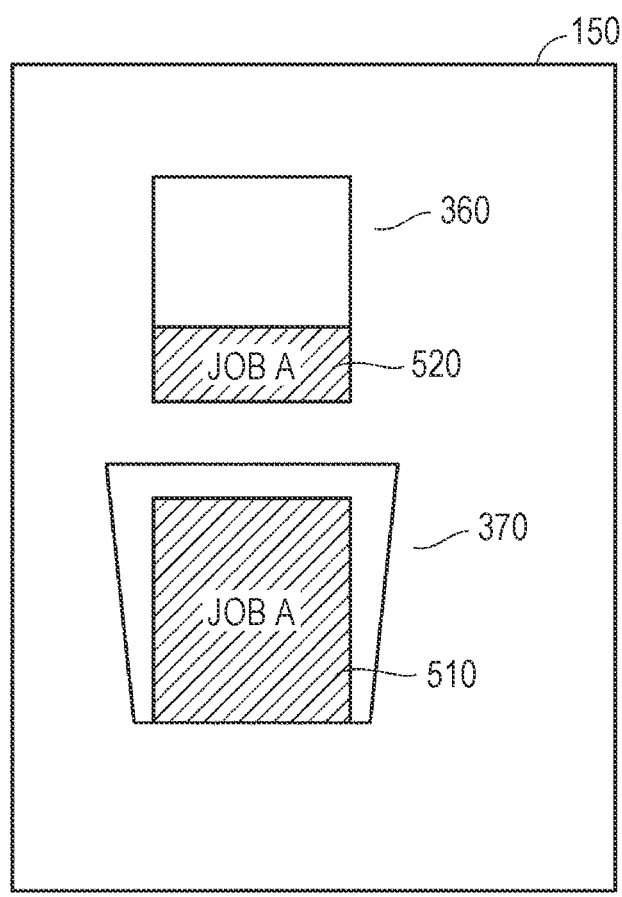
FIG. 5 is a view illustrating a state of paper in a case where post-processing of a job A on the image forming device is completed.

Conveyance of paper in the paper ejection unit 150 is described with reference to FIG. 5. FIG. 5 is a view illustrating a state of the paper in a case where post-processing of a job Aon the image forming device 220 is completed. In a certain aspect, the paper ejection unit 150 includes a temporary buffer 360 and a card tray 370. The temporary buffer 360 serves as the first placing unit 151. The card tray 370 serves as the second placing unit 152.

The paper conveyed from the cutting unit 310 as the job A is first accumulated in the temporary buffer 360. When the temporary buffer 360 is filled with paper, the paper is transferred to the card tray 370 (paper 510).

If paper 510 remains in the card tray 370 when the temporary buffer 360 is filled with paper, a message requesting that the paper be taken out of the card tray 370 is displayed on the operation panel 90 or output by audio. In another aspect, the information communication device that delivers a printing instruction to the image forming system 100 may receive a signal that outputs the above-described message, and a monitor of the information communication device may display the above-described message.

Figure 6A:
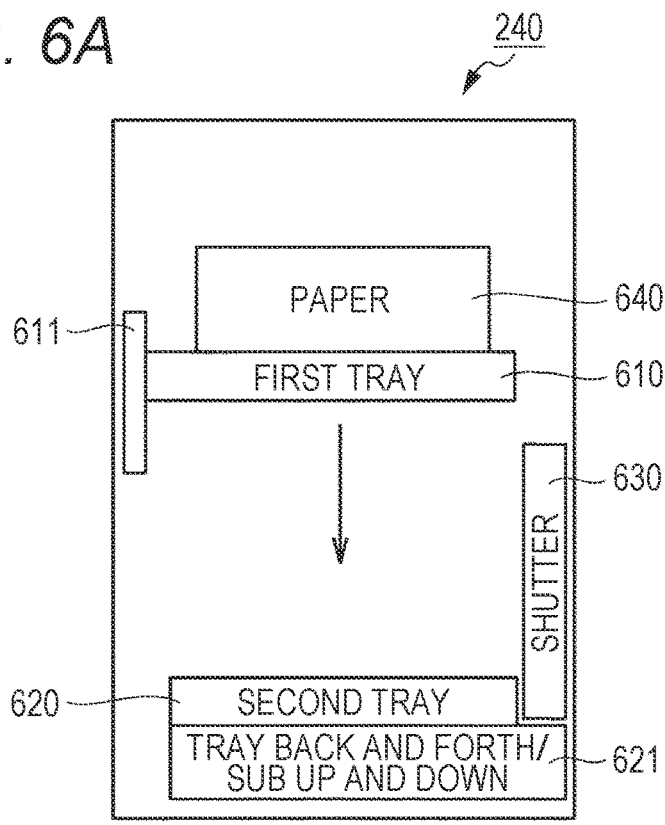
FIGS. 6A and 6B are block diagrams illustrating an outline of a paper ejection device according to a certain embodiment.
Figure 6B:
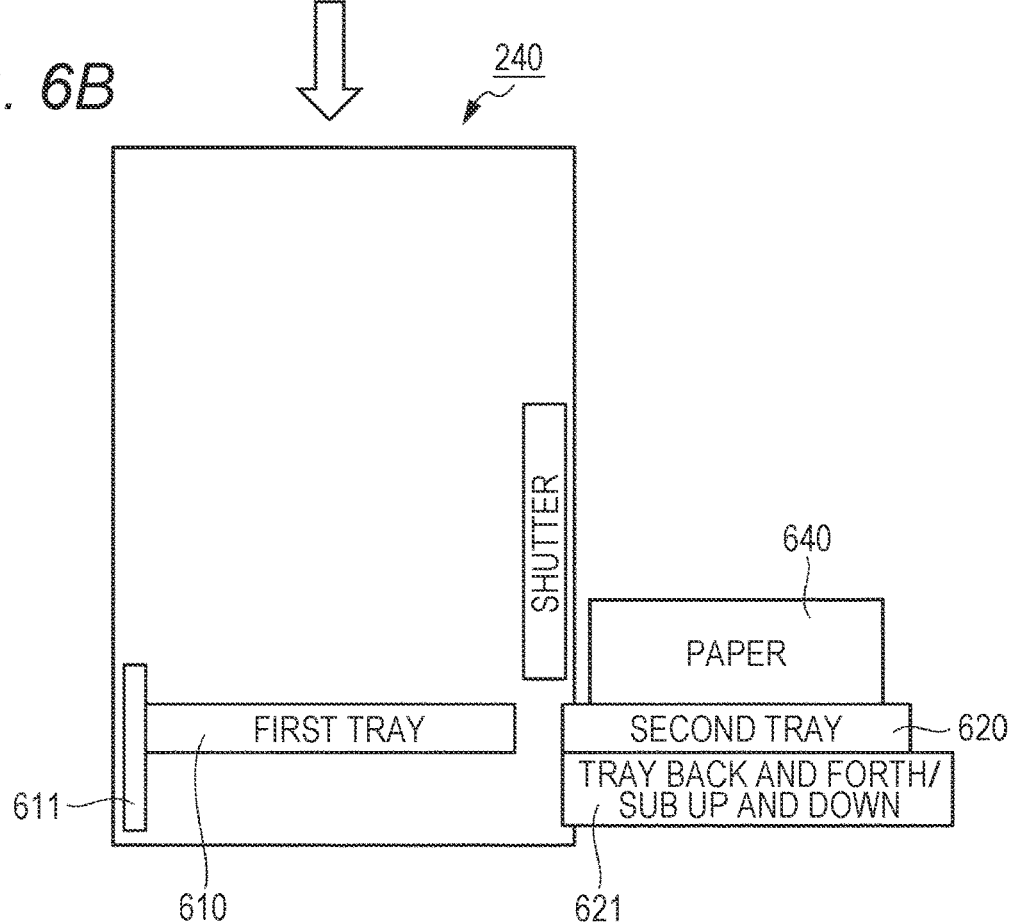

A configuration of the paper ejection device 240 is described with reference to FIGS. 6A and 6B. FIGS. 6A and 6B are block diagrams illustrating an outline of the paper ejection device 240 according to a certain embodiment. The paper ejection device 240 includes a first tray 610, an actuator 611, a second tray 620, an actuator 621, and a shutter 630.

The first tray 610 stores the paper conveyed from the post-processing device 230 as the temporary buffer 360. The actuator 611 lifts up or down the first tray 610. In a certain aspect, when the first tray 610 is filled with paper, the actuator 611 is lifted down. When the first tray 610 becomes empty, the actuator 611 lifts up the first tray 610. It is determined whether the first tray 610 is filled with paper based on an output of any one of a mechanical sensor, an electric sensor, or an optical sensor.

The second tray 620 is, for example, the card tray 370. The paper stored in the first tray 610 is transferred to the second tray 620. When the lock (not illustrated) of the shutter 630 is released and the shutter 630 is opened, the actuator 621 delivers the second tray 620 from the inside of a housing of the paper ejection device 240 to the outside. The user may take out the printed matter (for example, business card) from the second tray 620.

<Control Structure>

A control structure of the image forming system 100 is described with reference to FIGS. 7 and 8. FIG. 7 is a flowchart illustrating a part of processing executed by the CPU 11 of the image forming device 220. In this case, the CPU 11 executes each command included in the program stored in the ROM 12 or the NVRAM 14. The program is stored in advance in the storage unit 140 such as the ROM 12 or the NVRAM 14 by the manufacturer of the image forming system 100. In another aspect, the program may optionally be installed in the image forming system 100 by a provider of the post-processing device 230. In this case, the program may be installed via the Internet or other communication line, or from a computer terminal connected to the network I/F 70.

With reference to FIG. 7, at step S710, the CPU 11 outputs a command to eject the printed paper to the card tray while the paper is being printed. More specifically, in a certain aspect, when the image forming device 220 completes printing, the paper is sent from the image forming device 220 to the post-processing device 230. The post-processing device 230 first conveys the paper to the temporary buffer 360 after performing predetermined post-processing (for example, cutting). When the temporary buffer 360 is filled with paper, or when it is detected that the job is finished because final printing is completed, the paper is conveyed from the temporary buffer 360 to the card tray 370.

At step S720, the CPU 11 determines whether it is not possible to eject to the card tray. This determination is performed, for example, based on whether the paper stored in the card tray 370 remains. When the CPU 11 determines that it is not possible to eject (YES at step S720), this switches control to step S730.

Otherwise (NO at step S720), the CPU 11 finishes the processing.

At step S730, the CPU 11 determines whether to continue printing. This is determined based on whether printing of the number of sheets designated by the job is completed. When the CPU 11 determines to continue printing (YES at step S730), this switches the processing to step S740. Otherwise (NO at step S730), the CPU 11 finishes the processing.

At step S740, the CPU 11 determines whether the paper stored in the temporary buffer and the paper stored in the card tray are the paper output by the same job. This is determined, for example, based on the number of sheets designated by the job, the number of sheets ejected to the temporary buffer 360, the number of sheets stored in the card tray 370, and the number of sheets taken out of the card tray 370. For example, in a case where the number of sheets to be printed designated by the job is 1,000, in a case where the number of sheets stored in the temporary buffer 360 is 300, the number of sheets stored in the card tray 370 is 600, and the number of sheets taken out of the card tray 370 is 0, the CPU 11 determines that the job is not completed. Therefore, in this case, the CPU 11 determines that the paper stored in the temporary buffer 360 and the paper stored in the card tray 370 are the paper based on the same job. When the CPU 11 determines that these pieces of paper are those based on the same job (YES at step S740), this switches the control to step S750. Otherwise (NO at step S740), the CPU 11 finishes the processing.

At step S750, the CPU 11 displays a warning. For example, the CPU 11 displays a message indicating this on the operation panel 90, or transmits the message to the information processing device that transmits a job command to the image forming system 100.

In this manner, according to a certain embodiment, in a case where the printed matter of the same job remains in the temporary buffer 360, the image forming device 220 notifies of this, so that the printed matter is prevented from being left untaken by the user who provides the printing instruction corresponding to the job.

Meanwhile, in another aspect, a plurality of processors may execute the following processing as a whole. In still another aspect, one or a plurality of circuit elements may execute each processing.

Figure 8:
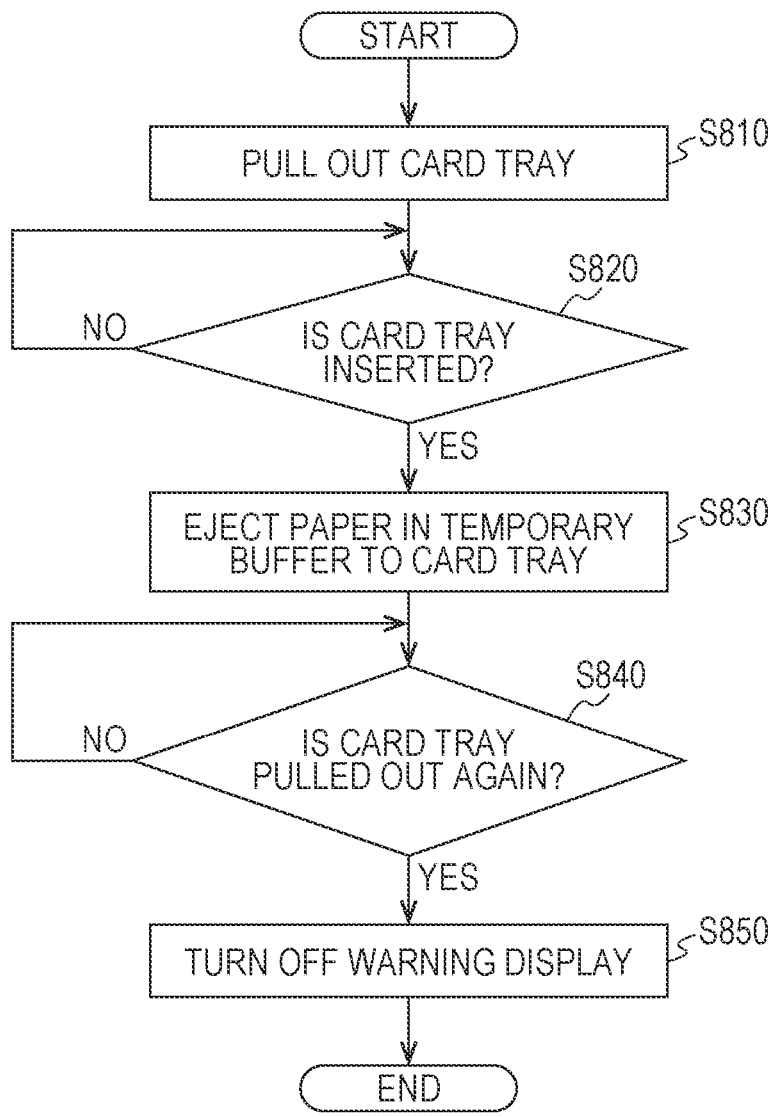
FIG. 8 is a flowchart illustrating a part of the processing executed by the CPU in a case where a warning that a printed matter is left untaken is issued and then the warning is finished.

FIG. 8 is a flowchart illustrating a part of the processing executed by the CPU 11 in a case where the warning that the printed matter is left untaken is issued and then the warning is finished.

At step S810, the CPU 11 detects that the card tray 370 is pulled out. At step S820, the CPU 11 determines whether the pulled out card tray 370 is inserted. This is determined, for example, by using a sensor (not illustrated) provided on a housing to which the card tray 370 is attached. In a case where the card tray 370 is inserted in a predetermined position in the housing, the sensor outputs a signal indicating that the card tray 370 is inserted. This signal is input to the CPU 11 after being analog-to-digital converted. When the CPU 11 determines that the card tray 370 is inserted (YES at step S820), this switches the control to step S830. Otherwise (NO at step S820), the CPU 11 repeats the processing at step S820 again.

At step S830, the CPU 11 drives the actuator to eject the paper stored in the temporary buffer 360 to the card tray 370.

At step S840, the CPU 11 determines whether the card tray 370 is pulled out again. This is determined based on a signal output from the sensor. For example, in a case where the sensor that detects an attaching state of the card tray 370 in the housing does not detect the state of the card tray 370, a signal indicating this is input to the CPU 11. In this case, the CPU 11 may determine that the card tray 370 is pulled out of the housing. At that time, the user who draws the card tray 370 may take out the remaining paper. When the CPU 11 determines that the card tray 370 is pulled out again (YES at step S840), this switches the control to step S850. Otherwise (NO at step S840), the CPU 11 repeats the processing at step S840 again. At step S850, CPU 11 turns off the warning display.

In this manner, when the card tray 370 becomes empty in a case where the paper remains in the temporary buffer 360, the image forming system 100 transfers the paper remaining in the temporary buffer 360 to the card tray 370. The user may draw the card tray 370 again to take out the remaining paper. When the image forming system 100 detects that both the temporary buffer 360 and the card tray 370 are empty, this turns off the warning display. In this manner, it is possible to prevent the printed matter generated in the job executed in the image forming system 100 from being left untaken.

<Warning Notification Mode>

Figure 9:
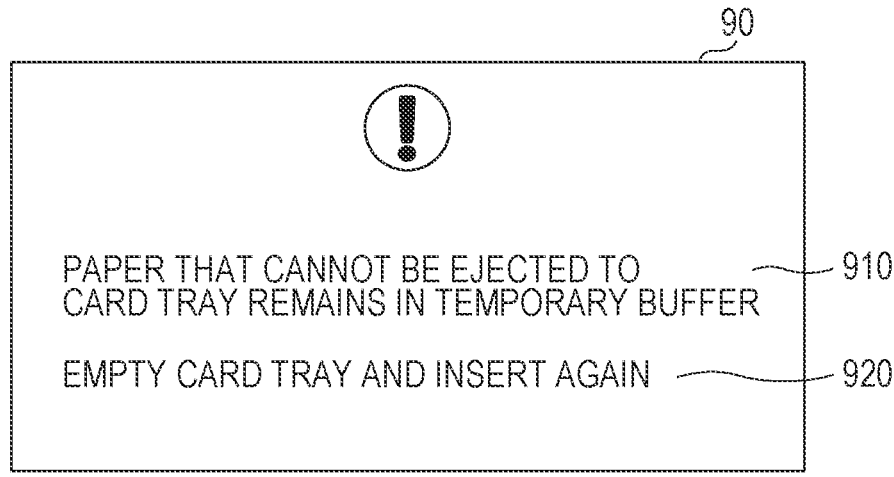
FIG. 9 is a view illustrating an example of a warning message displayed on an operation panel according to a certain embodiment.
Figure 10:
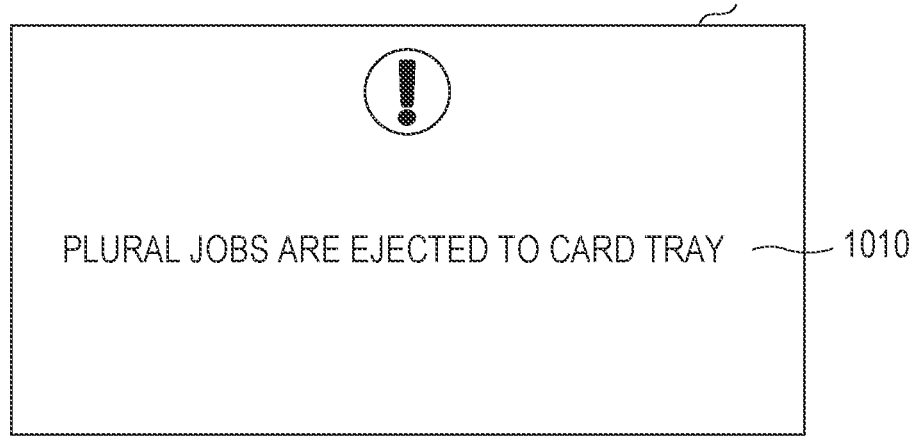
FIG. 10 is a view illustrating an example of the warning message displayed on the operation panel according to a certain embodiment.
Figure 11:
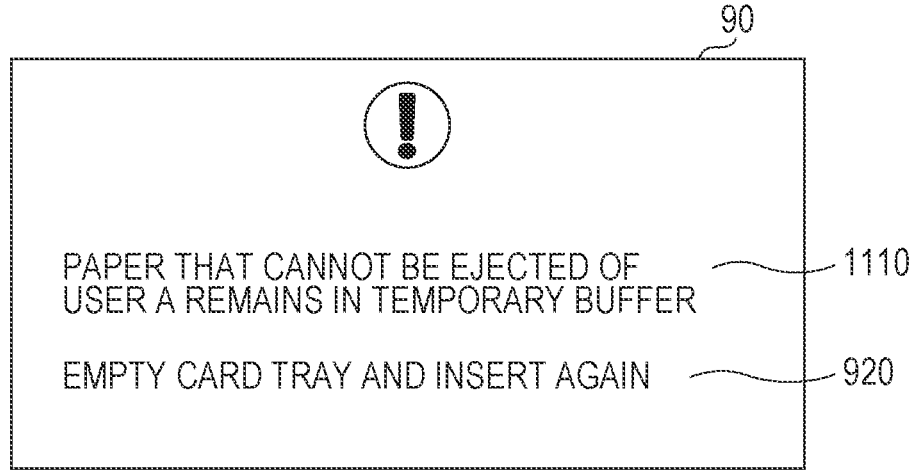
FIG. 11 is a view illustrating an example of the warning message displayed on the operation panel according to a certain embodiment.

A warning notification mode is described with reference to FIGS. 9 to 11. FIGS. 9 to 11 are views illustrating an example of a warning message displayed on the operation panel 90 according to a certain embodiment.

As illustrated in FIG. 9, when the image forming system 100 detects that the paper remains in the temporary buffer 360, this displays a message 910 notifying the user of this and a message 920 prompting the user to take out the paper on the operation panel 90. When checking these messages, the user who provides the printing instruction that triggers an output of the paper may notice that the printed matter remains in the temporary buffer 360 and take out the same.

In another aspect, there is a case where the same user provides a plurality of printing instructions. In this case, each printing instruction is provided to the image forming system 100 as a separate job, and image formation processing (printing) is executed for each job. The image forming system 100 executes the post-processing for each job, and ejects the printed matter after the post-processing to the temporary buffer 360. When the temporary buffer 360 is filled with the printed matters, the printed matters are transferred to the card tray 370. In such a case, the printed matter on the top of the paper stored in the card tray 370 might be different from the printed matter at the bottom.

Therefore, as illustrated in FIG. 10, in another aspect, the image forming system 100 may notify that the printed matter corresponding to each of a plurality of jobs remains. For example, the operation panel 90 may display a message 1010 notifying that a plurality of jobs remains in the card tray 370. When the user visually recognizes the message 1010, the user may be careful not to mix the printed matters of different jobs when taking out the paper from the card tray 370.

In still another aspect, there is a case where user information is associated with each job. For example, in a case where a plurality of information communication devices is connected to the image forming system 100, the user of each information communication device might provide printing instruction separately. In this case, the image forming system 100 may notify each user that the paper remains in the temporary buffer.

As illustrated in FIG. 11, more specifically, the operation panel 90 may display a message 1110 notifying that the paper printed by a job for a certain user (A) remains, and a message 920 prompting the user to take out the paper. When the user A visually recognizes the message 1110, the user A may transfer the printed matter to the card tray 370 by performing an operation for ejecting the printed matter stored in the temporary buffer 360. As a result, it is possible to prevent the printed matter stored in the temporary buffer 360 from being left untaken.

Figure 12:
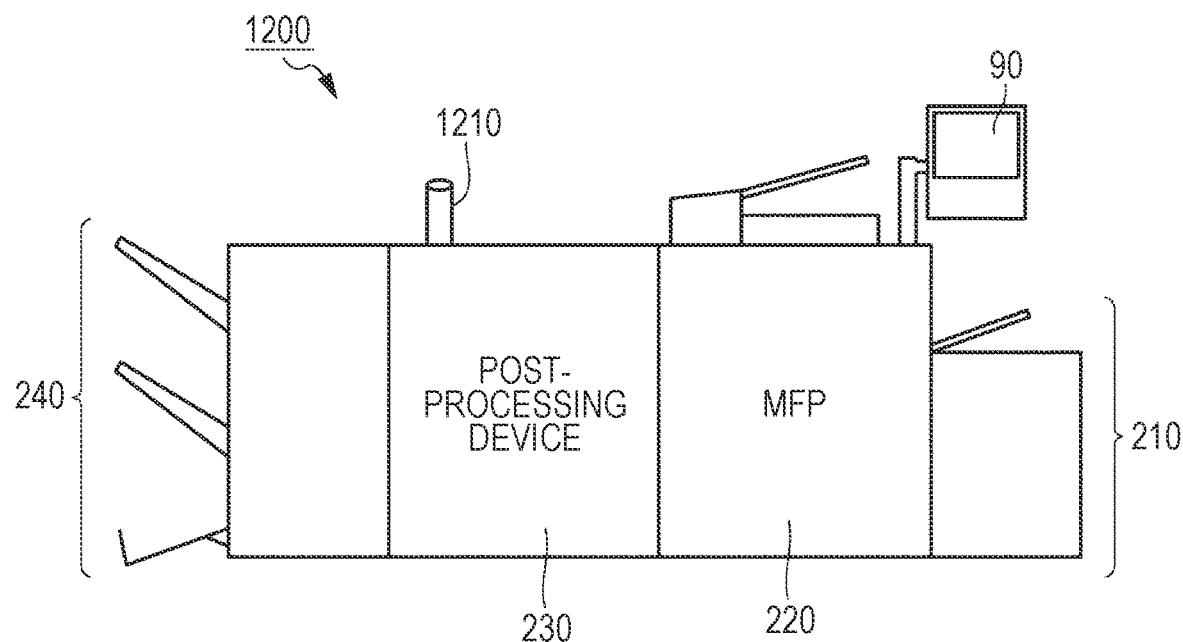
FIG. 12 is a view illustrating an appearance of a configuration of an image forming system that warns that paper is left untaken according to another aspect.

Another mode of warning is described with reference to FIG. 12. FIG. 12 is a view illustrating an appearance of a configuration of an image forming system 1200 that warns that paper is left untaken according to another aspect. The warning that the paper is left untaken is not limited to the above-described message. For example, the image forming system 1200 according to another aspect may warn that the paper is left untaken not by message but by light. As a result, even a user who is not in the vicinity of the image forming system 1200 may easily remotely recognize that the paper is left untaken.

More specifically, the image forming system 1200 is further provided with a light 1210. The light 1210 is, for example, a warning light and the like such as a flasher. When the image forming system 1200 detects that paper remains in the temporary buffer 360, paper corresponding to a plurality of jobs remains in the card tray, or paper corresponding to the job associated with the user information remains in the temporary buffer 360, this turns on the light 1210 to notify of this. In another aspect, the light 1210 may rotate and light.

The technical characteristics disclosed above may be summarized as follows.

[Configuration 1] An image forming system 100 is provided with a first placing unit 151 for storing paper ejected after image formation processing, a second placing unit 152 for storing the paper transferred from the first placing unit 151, a CPU 11 for controlling an operation of the image forming system 100, and a notification unit for notifying of a state of the image forming system 100 (for example, an operation panel 90, a speaker, a network I/F 70 and the like). The CPU 11 determines whether the paper remains in the first placing unit 151, and allows a notification unit 170 to notify that the paper is left untaken based on determination that the paper remains in the first placing unit 151. In a certain aspect, the notification unit 170 outputs a warning sound or a warning message as a speaker. In another aspect, the notification unit 170 displays a warning message as a monitor. In another aspect, the notification unit 170 transmits a signal that outputs the warning sound or the warning message to an information processing device that transmits a command to the image forming system 100 as a communication interface.

[Configuration 2] In addition to the above-described configuration, in a certain aspect, the CPU 11 determines that the paper remains in the first placing unit 151 when the paper is ejected to the first placing unit 151 in a case of detecting that the paper cannot be transferred to the second placing unit 152 while a job that instructs image formation is being executed.

[Configuration 3] In addition to the above-described configuration, in a certain aspect, the image forming system 100 is further provided with a sensor for detecting whether the paper is stored in the first placing unit 151. The sensor is realized by, for example, a mechanical sensor such as a toggle switch, an infrared sensor and the like. Determining whether the paper remains in the first placing unit 151 includes determining whether the paper remains in the first placing unit 151 based on an output from the sensor.

[Configuration 4] In addition to the above-described configuration, the CPU 11 finishes the notification by the notification unit 170 when, after the paper stored in the second placing unit 152 is taken out, the paper is transferred from the first placing unit 151 to the second placing unit 152 and the paper stored in the second placing unit 152 is taken out. For example, the output of the warning sound or the warning message by the speaker is finished and the warning message displayed on the monitor is turned off.

[Configuration 5] In addition to the above-described configuration, in a certain aspect, the second placing unit 152 may be pulled out of the image forming system, Taking out the paper stored in the second placing unit 152 includes pulling out the second placing unit 152 from the image forming system to take out the paper.

[Configuration 6] In addition to the above-described configuration, in a certain aspect, the second placing unit 152 includes a support that receives the paper transferred from the first placing unit 151 to be stacked. The support is made of, for example, a resin molded into a comb shape or a fence shape. Taking out the paper stored in the second placing unit 152 includes taking out the paper received by the support.

[Configuration 7] In addition to the above-described configuration, in a certain aspect, the CPU 11 determines that paper ejected by execution of a first job and paper ejected by execution of a second job remain in the first placing unit 151 in a case of detecting that the paper cannot be transferred from the first placing unit 151 to the second placing unit 152 after executing the first job and the second job that instruct image formation.

[Configuration 8] In addition to the above-described configuration, in a certain aspect, a job provided to the image forming system for instructing image formation is associated with user identification information for identifying a user who provides the instruction. The notification unit 170 notifies that the paper is left untaken based on a fact that the user identification information associated with the job corresponding to the paper stored in the first placing unit 151 and the user identification information associated with the job corresponding to the paper stored in the second placing unit 152 are the same.

Since the image forming system 100 may notify the user that a printed matter is left untaken in a state in which the printed matter remains in a temporary buffer 360, so that it is possible to prevent the printed matter (for example, a business card, an invitation card, a Christmas card and any other cards) remaining in the temporary buffer 360 from being left untaken. As a result, the image forming system 100 provided with a plurality of storages for storing the printed matters may prevent the printed matter remaining in the temporary buffer from being left untaken even in a case where the printed matters based on the same job are separated in two storages (temporary buffer and card tray).

The disclosed technology is applicable to a device provided with a plurality of paper ejection trays.

Although embodiments of the present invention have been described and illustrated in detail, the disclosed embodiments are made for purposes of illustration and example only and not limitation. The scope of the present invention should be interpreted not by terms of the description above but by terms of the appended claims, and it is intended that equivalents of the scope of claims and all modifications within the scope are included.

What is claimed is:

1. An image forming system comprising:
    a first storage that stores paper ejected after image formation processing;
    a second storage that stores the paper transferred from the first storage;
    a hardware processor that controls an operation of the image forming system; and
    a notifier that notifies of a state of the image forming system, wherein
    the hardware processor determines whether the paper remains in the first storage, and allows the notifier to notify that the paper is left untaken based on a determination that the paper remains in the first storage,
    wherein the first storage is configured to receive and store therein a plurality of sheets of paper simultaneously, and the hardware processor controls the image forming system such that the paper is transferred from the first storage to the second storage when the first storage is filled with paper.

2. The image forming system according to claim 1, wherein
    the hardware processor determines that the paper remains in the first storage when the paper is ejected to the first storage in a case of detecting that the paper cannot be transferred to the second storage while a job that instructs image formation is being executed.

3. The image forming system according to claim 1, further comprising:
    a sensor that detects whether the paper is stored in the first storage,
    wherein determining whether the paper remains in the first storage includes determining whether the paper remains in the first storage based on an output from the sensor.

4. The image forming system according to claim 1, wherein
    when, after the paper stored in the second storage is taken out, the paper is transferred from the first storage to the second storage and the paper stored in the second storage is taken out, the hardware processor finishes notification by the notifier.

5. The image forming system according to claim 4, wherein
    the second storage may be pulled out of the image forming system, and
    taking out the paper stored in the second storage includes pulling out the second storage from the image forming system to take out the paper.

6. The image forming system according to claim 4, wherein
    the second storage includes a support that receives the paper transferred from the first storage to be stacked, and
    taking out the paper stored in the second storage includes taking out the paper received by the support.

7. The image forming system according to claim 1, wherein
    the hardware processor determines that paper ejected by execution of a first job and paper ejected by execution of a second job remain in the first storage in a case of detecting that the paper cannot be transferred from the first storage to the second storage after executing the first job and the second job that instruct image formation.

8. The image forming system according to claim 1, wherein
    a job provided to the image forming system for instructing image formation is associated with user identification information for identifying a user who provides the instruction, and
    notification by the notifier includes notifying that the paper is left untaken based on a fact that the user identification information associated with a job corresponding to the paper stored in the first storage and the user identification information associated with a job corresponding to the paper stored in the second storage are the same.

9. A control method of an image forming system, the control method comprising:
    ejecting paper after image formation processing to a first area;
    transferring the paper from the first area to a second area;
    determining, by a hardware processor, whether the paper remains in the first area; and
    notifying that the paper is left untaken based on a determination that the paper remains in the first area,
    wherein a plurality of sheets of paper are received in the first area and stored in the first area simultaneously, and the method further comprises controlling, by the hardware processor, the image forming system such that the paper is transferred from the first area to the second area when the first area is filled with paper.

10. The control method according to claim 9, wherein
the determining includes determining that the paper remains in the first area when the paper is ejected to the first area in a case of detecting that the paper cannot be transferred to the second area while a job that instructs image formation is being executed.

11. The control method according to claim 9, wherein
the determining whether the paper remains in the first area includes determining whether the paper remains in the first area based on an output from a sensor.

12. The control method according to claim 9, further comprising:
finishing the notification when, after the paper stored in the second area is taken out, the paper is transferred from the first area to the second area and the paper stored in the second area is taken out.

13. The control method according to claim 12, wherein
the second area may be pulled out of the image forming system, and
taking out the paper stored in the second area includes pulling out the second area from the image forming system to take out the paper.

14. The control method according to claim 12, wherein
the second area includes a support that receives the paper transferred from the first area to be stacked, and
taking out the paper stored in the second area includes taking out the paper received by the support.

15. The control method according to claim 9, wherein
determining whether the paper remains in the first area includes determining that paper ejected by execution of a first job and paper ejected by execution of a second job remain in the first area in a case of detecting that the paper cannot be transferred from the first area to the second area after executing the first job and the second job that instruct image formation.

16. The control method according to claim 9, wherein
a job provided to the image forming system for instructing image formation is associated with user identification information for identifying a user who provides the instruction, and
the notifying includes notifying that paper is left untaken based on a fact that the user identification information associated with a job corresponding to the paper stored in the first area and the user identification information associated with a job corresponding to the paper stored in the second area are the same.

17. A non-transitory recording medium storing a computer readable program for allowing a computer to execute the control method according to claim 9.

\* \* \* \* \*